United States Patent [19]

Yorkston

[11] 4,008,529

[45] Feb. 22, 1977

[54] TEACHING APPARATUS AND METHOD

[76] Inventor: Neil Yorkston, 21 Liskeard Gardens, Blackheath, London SE3 OPE, England

[22] Filed: Nov. 7, 1975

[21] Appl. No.: 629,832

Related U.S. Application Data

[63] Continuation of Ser. No. 509,461, Sept. 26, 1974, abandoned.

[52] U.S. Cl. .................................. 35/35 E; 35/9 E
[51] Int. Cl.² .......................................... G09B 17/00
[58] Field of Search ................. 35/8 R, 9 EF, 35 R, 35/35 E, 26, 28, 36, 37, 48 A, 66; 281/31

[56] References Cited

UNITED STATES PATENTS

| 807,648 | 12/1905 | Wiggins | 281/31 |
|---|---|---|---|
| 2,075,529 | 3/1937 | Leubrie | 35/26 |
| 3,021,612 | 2/1962 | Palmer | 35/9 E |
| 3,135,059 | 6/1964 | Barish | 35/66 |
| 3,613,266 | 10/1971 | Conway | 35/66 |

FOREIGN PATENTS OR APPLICATIONS

| 1,038,640 | 8/1966 | United Kingdom | 35/35 E |

*Primary Examiner*—William H. Grieb
*Attorney, Agent, or Firm*—Neuman, Williams, Anderson & Olson

[57] ABSTRACT

A teaching apparatus and method are disclosed which utilize pages having written material thereon to be learned in combination with transparent sheets having selected opaque areas, the transparent sheets preferably being about the size of one of said pages. In the apparatus each transparent sheet contains randomly spaced, opaque areas which obscure parts of individual letters, whole letters or larger sized multiple indicia portions of the written material. The transparent sheets are necessarily assembled in register and maintained in register with one another and are fastened together along one of their common edges to form a set. The method of using the apparatus is generally as follows: after the written material has been read in its entirety, the bottom transparent sheet in the set is placed alone over the page of printed material so that the random marks on the transparent sheet partially obscure the underlying indicia. The partially obscured written page is then studied even though partially obscured. The recollection and logical deduction of the reader provides the obscured portion whereby the learning process is enhanced. Additional sheets with interlaced random marks are then overlaid on the printed sheet with the random marks progressively obscuring additional areas of the underlying printed material. As each successive transparent sheet is overlayed upon its predecessor, the written material is progressively more fully obscured, thus compelling a user of the teaching apparatus to recall step by step more and more of the substance, or display words on the page of written material. When one page of indicia bearing material has been studied by the learner, the set of transparent sheets may be reused upon another page of material.

12 Claims, 6 Drawing Figures

U.S. Patent  Feb. 22, 1977  4,008,529
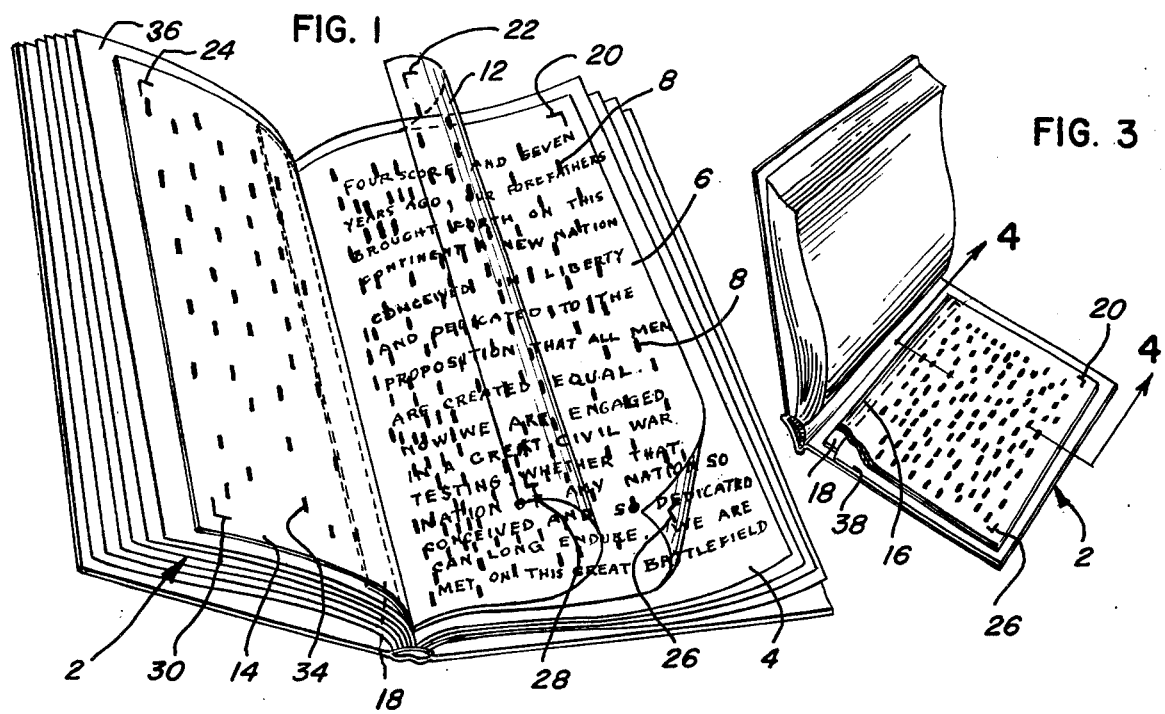
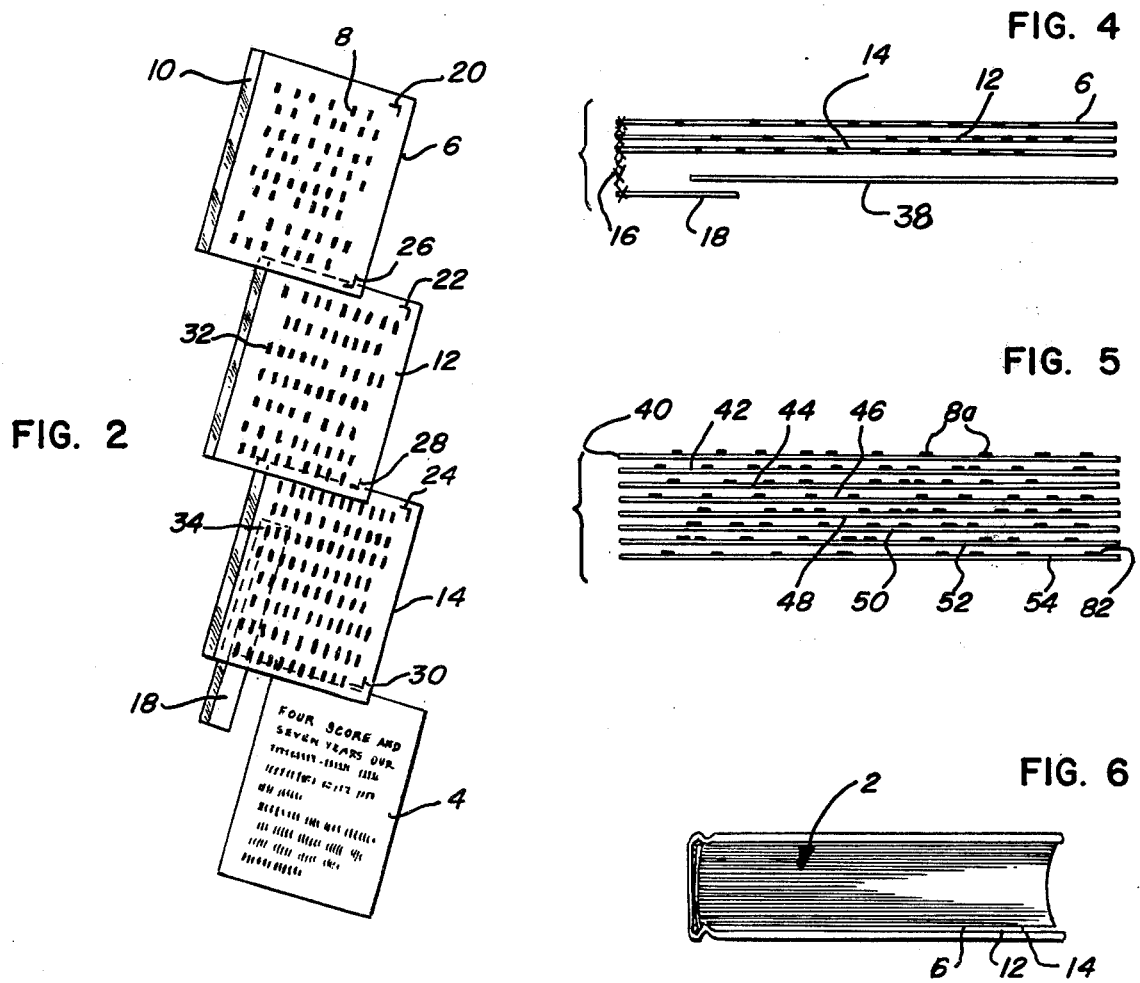

TEACHING APPARATUS AND METHOD

This is a continuation of application Ser. No. 509,461 filed Sept. 26, 1974 and now abandoned.

BACKGROUND OF THE INVENTION

Several devices have been used in the past utilizing a so-called "vanishing technique" to promote and facilitate the learning of written material. The principle of this technique is to cause the written material to gradually disappear. For example, the technique may be performed by writing the material to be learned on a blackboard with chalk and then erasing letters, then words, then phrases and finally the material in its entirety.

The vanishing technique may also be used by writing the material to be learned with a stylus upon a "magic slate" which is a common device having a backing sheet coated with a wax-like substance overlaid with a relatively translucent impression sheet and a transparent wear-resistant covering sheet. When the stylus is applied to the covering sheet, the pressure at the point of the stylus is transmitted through to the impression sheet and causes the impression sheet to adhere or bond to the backing and the writing to appear on the translucent impression sheet through the covering sheet. By gradually lifting the impression and covering sheets, the impression sheet is separated from the backing sheet to achieve progressive disappearance of the written material. Manifestly, the material written by the stylus disappears along the moving line of separation of the impression sheet from the backing sheet. As in the case of the use of a blackboard, above described, the written material cannot be reclaimed without writing it again on the magic slate.

In one specialized form of magic slate device adapted to cause selective disappearance of written material, shown in U.S. Pat. No. 3,135,059, a whole packet or set of backing sheets having holes of various sizes arranged in a pre-selected manner is covered by an impression sheet. When a stylus is used to create written material along guide lines permanently affixed to the impression sheet, the entire amount of written material to be learned appears on the impression sheet. Thereafter, as each backing sheet is separated in sequential order from the rear of the set, progressively greater amounts of the written material, i.e., The amounts impressed on each backing sheet through the holes in the sheets above, are deleted from the impression sheet.

A variation of the teaching instrument described above is shown and described in U.S. Pat. No. 3,613,266. Therein a sheet of printed or written material is attached to the slate for preliminary viewing by a student. After such preliminary viewing, the written material is folded out of the student's view, and he is required to test his recollection by writing his impressions with a stylus on the top sheet of the slate device. However, the stylus-written material is obscured to the student due to the fact that a fully opaque, non-bonding sheet is placed over the entire impression sheet of the slate. The student's writings are thus maintained invisible to him until the fully opaque sheet is lifted.

The principle upon which the foregoing devices operate is the use of a "magic slate" which causes stylus-written material to appear upon an overlay pressed against a backing sheet. When the overlay is lifted, the bond between the overlay and the backing sheet is eliminated and the written material destroyed. Moreover, any selected portions of the written material which are thus eliminated are subtracted from a student's view in a manner which prohibits further reference to the whole of the original writing.

Accordingly, it is an object of the present invention to provide an improved teaching apparatus and method which are adapted to permanently retain the written material to be studied while providing progressive obscuration.

It is another object of this invention to provide an improved teaching apparatus which is adapted to be transferred from one piece of written material to another or used with various materials.

It is another object of this invention to provide an improved teaching apparatus and method which include the use of a transparent overlay which does not require a permanent bond to a specific piece of written material to be studied.

It is another object of this invention to provide an improved teaching apparatus and method which may be used to progressively obscure the written material to be learned in a variety of sequences.

It is another object of this invention to provide an improved teaching apparatus and method which progressively obsure portions of the written material to be learned in mathematically random sequences.

It is another object of this invention to provide an improved teaching apparatus and method which are adapted to improve the confidence and accuracy of a student of the written material to be studied.

Other objects and advantages of the present invention will become apparent from an examination of the following detailed description of the invention, the drawings and the appended claims.

SUMMARY OF THE INVENTION

In carrying out this invention in one illustrative form, a teaching apparatus for use in impressing the informational content of a page of written material upon a reader is provided having a plurality of transparent pages adapted to overlie the page of written material. Each of the transparent pages contains a series or field of opaque blots therein disposed to obscure a portion of the written material, the opaque blots in each of said transparent pages being arranged to obscure different portions of the written material. By "written material" as used herein it is intended to include any graphic displays that are to be studied or learned including but not limited to longhand, typed or typeset text, drawings, photographs, charts, graphs or the like. A "blot" includes any obscuration which can be randomly and progressively placed in the field of vision. Although small opaque rectangles are preferred, oval, circles or irregular blots can also be employed.

DESCRIPTION OF THE DRAWINGS

In the accompanying drawings:

FIG. 1 is a perspective view of the use of a set of transparent sheets bound to a spline in conjunction with a book employing the teachings of the present invention, with the spline against the left-hand page and some of such sheets being partially rolled back from an opposite right hand underlying page of written material to be studied;

FIG. 2 is an exploded view in perspective, on a reduced scale, of one embodiment of the invention shown in FIG. 1, and including the page of written material to be learned;

FIG. 3 is a perspective view on a reduced scale of the embodiment of the invention shown in FIG. 1 showing the apparatus of the invention stored in the rear cover of a volume of written pages of material to be learned;

FIG. 4 is a sectional view on an expanded scale of the assembly of tranparent sheets shown in FIG. 3, taken along the lines 4—4 of FIG. 3;

FIG. 5 is a view of a modified form of the apparatus of the invention shown in similar section in FIG. 4; and FIG. 6 is an elevational view of the bottom of a volume of written material to be learned showing the assembly of transparent sheets of FIG. 1 stored in the rear cover of the volume.

DESCRIPTION OF THE PREFERRED EMBODIMENT

As shown in FIG. 1, a volume 2 of material to be learned has been opened to a page 4 of written material. An overlay sheet 6 of transparent material such as thin cellulose acetate sheet of 0.004 inch has been laid upon the page 4 so that spaced apart opaque blots 18 overlie various letters and portions of words on the written page. Thus it is impossible for a reader, without shifting the transparent sheet 6, to see the writing obscured by the blots. Transparent sheet 6 is fastened on bound along its left marginal edge 10 to similar transparent sheets 12 and 14, as by stitching or thermal fusion 16 (best seen in FIG. 4) or other flexible means which allow sheet 6 to fold freely around the fastened or bound edge 10, so that the set of bound-together transparent sheets may be wedged easily and comfortably into the junction of adjacent pages in the bound volume 2. A stiff spline 18, which is also freely foldable about the binding 16 of the transparent sheets may also be fastened to the left margin of the bound-together transparent set of sheets 6, 12 and 14.

The transparent sheets 6, 12 and 14 are assembled together by fusion 16 in a predetermined registration. As illustrated in FIGS. 1-3, a registry marker 20 which may be located on sheet 6 in the upper right corner thereof, as shown, is placed to coincide with a similar registry marker 22 on sheet 12 and also with a similar registry marker 24 on sheet 14. As shown, these registry markers are formed by short lines intersecting each other at right angles, but any other suitable means of registering the transparent sheets may be used.

When these sheets are bound or fastened together by fusion 16 or other binding means, it will be seen that the sheets will be readily coordinated in a fixed relationship when they are laid on top of one another in a stacked set, and registry may be automatic at the time of finding. However, if it is desired that the transparent sheets not be bound together, as above described, more graphic registry means such as a bull's eye and cross hairs may be employed. Other means may be used to obtain registry, such as, for example, notches in the edges of the sheets which may be aligned, or indentations which interfit with each other impressed into the margins of the sheets. In this manner, all of the transparent sheets will be caused to overlie each other in a fixed relationship.

It should also be noted that the use of a plurality of registry means may be desirable on each transparent sheet in order that absolute registry of the whole set of transparent sheets may be assured. Thus, as illustrated, a supplementary registry marker 26 is shown in the lower right corner of transparent sheet 6, and similar registry markers 28 and 30 are shown in lower right corners of transparent sheets 12 and 14, respectively.

As above described, opaque blots 8 overlie various letters and portions of words on the written page 4, thus obscuring those letters and portions of words to a reader. The blots 8 may be vicariously placed throughout sheet 6, but it is preferred that they be mathematically randomly arranged. In such a preferred arrangement a reader perhaps consciously but more likely subconsciously will readily adapt himself to exercising his recall ability at regulated intervals. Thus, for example, each first and sixth letter or space might be obscured when transparent sheet 6 is laid over the written material on written page 4. The opaque blots 8 may be made larger than the individual letters, and in such a construction each first and sixth section of letters or words will be obscured by the transparent overlay sheet 6. The individual blots 8 may also be smaller than an individual letter whereby the first overlay merely makes it more difficult to ascertain the identity of the letters. Subsequent random overlays combine with the first to obliterate whole letters or whole words.

Whenever a reader desires to confirm his recollection, he may simply lift sheet 6 to examine the written material in its entirety.

Transparent overlay sheet 12 also contains opaque blots 32 similar to blots 8 but arranged on sheet 12 to obscure letters or portions of the sheet of written material 4 different from those obscured by blots 8. The blots 32 may again be vicariously arranged, but it is preferred that they be mathematically randomly arranged to complement blots 8. In this complementary arrangement, the blots 32 may be organized to obscure an additional 20 percent of the area, for example, thereby obscuring from the reader a greater number of letters or greater portions of words than those obscured when only the first transparent sheet 6 is placed over the written material. The reader's capacity for recall will thereby be increased in an orderly manner when transparent sheet 6 is overlaid by transparent sheet 12. The percentage of the total visual area opacified by each overlay is determined from the desiderata of the particular embodiment. For example, with three sheets as shown in FIG. 2, each could obscure random blots totalling 30 percent of the area. On the other hand, the designer may find it desirable to obscure a greater percentage, say 40 percent of the area with opaque blots on the first overlay and then diminish the percentage obscured by successive blots.

An arrangement, as described, in which the transparent pages are constructed of a loosely flexible thin material, each adapted to be folded back upon itself to reveal an underlying page, also permits the reader to check the extent of his acquired knowledge by lifting only transparent sheet 12 and reviewing the amount of written material revealed through transparent sheet 6. Indeed, the reader may only wish to review a portion of the underlying material, and he may do so by folding only a part of sheet 12 back upon itself in order to review the ends of the lines revealed by transparent sheet 6.

Opaque blots 34 are arranged on transparent sheet 14 in a manner similar to the arrangment of blots on sheets 6 and 12 of FIG. 2. The relationship of the blots on sheet 14 complements the arrangement of blots on the preceding transparent sheets in order that when the sheets are superposed on one another they will obscure still greater amounts of the written material on page 4 from the reader in the same manner as the blots on sheet 12 obscure more written material than the blots on sheet 6 alone. If it is desired, the blots on sheet 14 may accomplish complete obscurity of the written material, thus demanding total recall by the reader. However, it may be sufficient to accomplish the total teaching objective to merely obscure only key portions of the written material, depending upon the goals of the instructor and the retention level or ability of the reader, as suggested above.

The foregoing description of the apparatus of this invention is oriented to teaching the subject matter written on a right-hand page in a volume, but it will be recognized that the apparatus is also adapted to be used on the left-hand page of the same volume, such as page 36, shown in FIG. 1. Ordinarily, the placing of the sheets of transparent material on left-hand page 36 takes place in reverse order to that used when learning the written material on right-hand page 4. Thus the transparent overlay sheet 14 is placed over the written material on page 36 immediately after the written material on that page has been studied in full. The teaching process above described then takes place in reverse order, according to the sequence in which the opaque blots obscure the written material on page 36, but, as before, the page 36 of written material will be progressively more obscured as each sheet containing blots is overlayed upon the sheet which precedes it. However, if the progression of obscuration is non-linear the assembly of transparent sheets can be turned over so that sheet 6 is always the first.

Although preferable, it is not necessary that the blots on the transparent sheets be especially adapted for a particular written page. The transparent pages may be adapted to be arranged in fixed horizontal and vertical registry with the page of written material, but the above-described apparatus may be manually adjusted between the top edge and bottom edge of the page on which it is placed without regard to orientation of the blots on the transparent sheet in any registry with the lines of writen material to be learned. Such lines may constitute all or only a portion of a printed page. It also may be desirable in some instances to place the rows of blots on the transparent sheets further apart or closer together vertically, i.e., from top to bottom on a sheet, depending upon the type of books with which the present invention is to be used. For example, young children's books may be, and usually are, set up with large print in lines which are widely separated, while some adult books are set up with very fine print in lines set close together. For various types of printed pages, however, adaptation of the herein-described teaching device may be accomplished by a manufacturer by vertically arranging the blots on each transparent sheet and the same blot size and spacing will be satisfactory for a wide range of type sizes and material formats. The blots on the transparent sheets will accomplish their intended purpose to a great degree by progressively obscuring in an orderly manner greater and greater amounts on any printed page on which the present invention is used irrespective of the printed material.

Various transparent materials may be used for making up the flexible transparent sheets of the present invention. Preferably, the pliable clear plastic materials such as the various acetates are desirable so that they may readily be folded back from each other and yet permit clear viewing of pre-selected portions of the underlying printed material, even when all sheets in the set are superposed on one another. The transparent materials should also be suitable for receiving opaque inks or other pigmented substances, either within the sheets as shown in FIG. 4, or on the surface of the sheets as shown by the positioning of blots 8a in FIG. 5, to obscure the progressively increasing portions of underlying printed materials.

Preferably, also, the materials of which the transparent sheets are made should be compatible with opaque substances for the blots which are the same color as the background of the printed material, i.e., the blots 8, 32 and 34 will be white when the printed page 4 is composed of white paper having black printed material on it to be learned. That is the blots and the background preferably have visual characteristics which blend and which contrast with the printed material on the background. Such an arrangement and construction is desirable particularly when the entire amount of printed material is intended to be obscured, i.e., completely covered by opaque blots when the set of transparent sheets are all in an overlying relationship, as shown by pages 40, 42, 44, 46, 48, 50, 52 and 54 in FIG. 5.

At times it will be desirable to construct the invention without binding the transparent sheets together although this makes registration difficult. Such binding obviously predetermines the order in which portions of the underlying printed material are obscured as well as registry. Accordingly, a set of transparent sheets may be provided, as shown by sheets 40–54 in FIG. 5, which are not bound together and may be shuffled. This permits the teaching apparatus to be used to vary the sequence in which portions of printed material may be obscured provided some clip or the like is used to provide registry following shuffling. While ordinarily it has been deemed desirable to use the apparatus of this invention to achieve predetermined sequence of obscuring printed material to be learned, one aspect of the invention is the variety which may be provided for an unusual student in learning the content of a page of written material. Whether the transparent sheets are bound together or unbound so that they may be shuffled to vary their sequence, they should be loosely flexible to permit their sequential movement into a superposed relationship on the page of written material.

When the present invention is intended for use with a particular volume of printed material, it will often be desirable to store the transparent sheets with the volume and they may be attached to a spline 18 as above described. During the time the transparent sheets are not in use, spline 18 may be inserted in a pocket 38 formed inside the cover of the volume 2, as shown in FIG. 3, in a manner well-known in the book binding art, and the transparent sheets thus stored with the volume in the manner shown in FIGS. 3 and 6. The spline 18 should be constructed of relatively stiff material to maintain storage of the transparent sheets within volume 2 but should also be either of such a size that it will occupy only the unused margin of a printed page and not obscure any printed material when the invention is in use, as shown in FIG. 1, or, if larger, constructed of such a transparent material as to permit the reader to view printed material through it.

The generation of the mathematically random blots can be accomplished by the use of a mathematical table of random numbers. By taking the random number chart and placing blots on a first transparent sheet in place of all "1's", blots on a second sheet in place of all "2's", etc., the overlays may be quickly generated. If the non-linear sequence is desired the first sheet could have blots for two of the indicia in a mathematically random display such as blots on the first sheet for all "1's" and "5's" of a mathematically random display of the numbers "1" to "9". Various combinations will immediately occur to the person who is applying the invention to specific problems. However, there is a unique visual effect produced by the use of a plurality of transparent sheets with inter-related mathematically random opaque blots, arranged in registry to provide a progressive obscuration of the material to be learned.

While the invention is particularly described as an aid to learning, it may be applied to other uses as well. For example, the overlays may readily be employed as a game involving the relative ability of two or more persons to discern a particular printed display. In this use, the players may start with maximum opacity and remove sheets.

Furthermore, the invention may be used in conjunction with various visual and graphic aids such as overhead projectors, flip charts, motion picture projectors and the like. In utilizing the invention with an overhead projector, the successive transparent overlays may either be put into position to obscure the written material or successively removed to reveal the material. In the latter case, the invention is well adapted for use in a game or contest environment where a member of the group viewing the projection responds when he or she recognizes the text which is being uncovered. The same techniques can be used in a flip chart type of visual aid. Both the overhead projector and flip chart may also be used as a teaching aid by progressively obscuring the written material and having the group respond either in unison or individually with regard to the partially obscured material.

The invention may also be beneficially applied to musical studies. Both vocal and instrumental performers are required on many occasions to perform without the benefit of a musical score. By partially and successively obscuring portions of the score the performer is assisted in learning the score and in some cases may also be assisted in generating his own adaptations and variations.

While particular embodiments of this invention are shown and described above, it will be understood, of course, that the invention is not limited thereto, since many modifications may be made by those skilled in the art, particularly in light of the teachings herein. It is contemplated, therefore, by the appended claims, to cover such modifications as fall within the true spirit and scope of the invention.

What is claimed is:

1. A visual display apparatus for use in controlling the observable information content of an arbitrarily selectable page of written material bearing intelligible indicia of one visual characteristic disposed on a background of a distinguishable second visual characteristic comprising:

a plurality of transparent sheets adapted to overlie the page of written material in an arbitrarily selectable position relative to said page and removable therefrom, each of said sheets containing a field of opaque blots spaced irregularly relative to said written material, the area of said sheet containing said field being otherwise substantially transparent, said blots on each sheet being disposed to obscure a plurality of portions of the written material, said portions being small relative to said written material, said blots on each sheet being arranged in relation to the opaque blots on others of said sheets to obscure different portions of the written material and progressively obscure a greater amount of said written material as additional ones of said sheets are placed over said page; and means separable from said page and attached to each of said plurality of transparent sheets adjacent an edge portion thereof to permit said transparent sheets to be disposed in overlying relationship and to maintain said sheets in registry.

2. The apparatus of claim 1 in which the opaque blots are affixed on the surface of the transparent sheets.

3. The apparatus of claim 1 in which the opaque blots are arranged in each sheet in a mathematically random manner.

4. The apparatus of claim 3 in which the opaque blots are arranged on the transparent sheets to obscure successively greater portions of the written material as each transparent sheet is overlaid upon the transparent page which precedes it in a non-linear progression.

5. The apparatus of claim 3 in which the opaque blots are arranged on the transparent sheets to obscure in successive stages the entire amount of written material.

6. The apparatus of claim 3 in which the transparent sheets containing the opaque blots are adapted to be rearranged in registry to provide varying sequences of coverage of the written material.

7. The apparatus of claim 3 in which the transparent sheets are adapted to be arranged in fixed horizontal and vertical registry with a plurality of pages of written material.

8. The apparatus of claim 3 in which the transparent sheets are arranged in a set engaged along one margin to maintain the transparent sheets in a fixed order with respect to one another.

9. The apparatus of claim 3 in which the transparent sheets are contained in a set and are loosely flexible to permit sequential movement of said sheets into a superposed relationship on the page of written material.

10. The apparatus of claim 3 in which the transparent sheets are hingedly affixed to a rigid spline adapted to be inserted beneath a cover flap jacket at the rear of a volume of written material.

11. The apparatus of claim 3 wherein said written material is verbal text comprising sequentially arranged symbols and said blots are rectangles of about the size of one symbol.

12. A visual display apparatus for use in controlling the observable information content of an arbitrarily selectable page of written material bearing intelligible indicia of one visual characteristic disposed on a background of a distinguishable second visual characteristic comprising:

a plurality of transparent sheets adapted to overlie the page of written material in an arbitrarily selectable position relative to said page and removable therefrom, each of said sheets containing a field of opaque blots spaced irregularly relative to said written material and having a blot visual characteristic contrasting with said one visual characteristic and blending with said second visual characteristic, the area of said sheet containing said field being otherwise substantially transparent, said blots on each sheet being disposed to obscure a plurality of portions of the written material, said portions being small relative to said written material, said blots on each sheet being arranged in relation to the opaque blots on others of said sheets to obscure different portions of the written material and progressively obscure a greater amount of said written material as additional ones of said sheets are placed over said page; and means separable from said page and attached to each of said plurality of transparent sheets adjacent an edge portion thereof to permit said transparent sheets to be disposed in overlying relationship and to maintain said sheets in registry.

* * * * *